United States Patent
Chen et al.

(10) Patent No.: US 10,826,406 B1
(45) Date of Patent: Nov. 3, 2020

(54) ALTERNATOR AND RECTIFIER THEREOF

(71) Applicant: ACTRON TECHNOLOGY CORPORATION, Taoyuan (TW)

(72) Inventors: Wei-Jing Chen, Taoyuan (TW); Shang-Shu Chung, Taoyuan (TW); Yen-Yi Chen, Taoyuan (TW); Huei-Chi Wang, Taoyuan (TW)

(73) Assignee: ACTRON TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 16/591,653

(22) Filed: Oct. 3, 2019

(30) Foreign Application Priority Data

Jun. 27, 2019 (TW) .............................. 108122576 A (51) Int. Cl.
  *H02M 7/217* (2006.01)
  *H02P 9/02* (2006.01)
  *H02M 1/08* (2006.01)
  *H02M 1/00* (2006.01)

(52) U.S. Cl.
  CPC ............. *H02M 7/217* (2013.01); *H02M 1/08* (2013.01); *H02P 9/02* (2013.01); *H02M 2001/0048* (2013.01)

(58) Field of Classification Search
  CPC ............ H02M 7/217; H02M 1/08; H02P 9/02
  See application file for complete search history.

(56) References Cited

U.S. PATENT DOCUMENTS

| | | | | |
|---|---|---|---|---|
| 2014/0218976 A1* | 8/2014 | Luo | .................... | H02M 3/33507 363/21.01 |
| 2015/0229223 A1* | 8/2015 | Cao | ......................... | H02M 1/08 363/21.13 |
| 2016/0315553 A1 | 10/2016 | Ishimaru et al. | | |
| 2017/0110959 A1* | 4/2017 | Ishimaru | ................ | H02M 7/217 |
| 2018/0013352 A1* | 1/2018 | Cao | .................... | H02M 3/33592 |
| 2018/0167000 A1 | 6/2018 | Pidutti et al. | | |
| 2018/0191152 A1* | 7/2018 | Ishimaru | ................ | H02M 7/219 |
| 2019/0074826 A1* | 3/2019 | Tran | ..................... | H03K 17/0822 |
| 2019/0319542 A1* | 10/2019 | Denzner | ............ | H02M 3/33576 |
| 2020/0036293 A1* | 1/2020 | Kannan | .................... | H02M 1/08 |
| 2020/0112256 A1* | 4/2020 | Matsuda | ............ | H02M 3/33507 |
| 2020/0161973 A1* | 5/2020 | Fukushima | ............ | H03F 1/0205 |

FOREIGN PATENT DOCUMENTS

TW I595737 8/2017
TW 201820762 6/2018

* cited by examiner

*Primary Examiner* — Sean Gugger
(74) *Attorney, Agent, or Firm* — JCIPRNET (57) ABSTRACT

An alternator and a rectifier thereof are provided. The rectifier includes a rectifying transistor, a gate driving circuit and a voltage clamping circuit. The rectifying transistor generates a rectified voltage according to an input voltage and is controlled by a gate voltage. The gate driving circuit generates the gate voltage according to a difference between the rectified voltage and the input voltage. The gate driving circuit provides the gate voltage in a first time interval when the difference is less than the first predetermined threshold voltage, and makes the difference equal to the first reference voltage. The gate driving circuit adjusts the gate voltage in a second time interval and the difference is equal to the second reference voltage. In the second time interval, the voltage clamping circuit clamps the gate voltage by comparing the difference with the third reference voltage and the gate voltage with the fourth reference voltage.

12 Claims, 12 Drawing Sheets

ALTERNATOR AND RECTIFIER THEREOF

CROSS-REFERENCE TO RELATED APPLICATION

This application claims the priority benefit of Taiwan application serial no. 108122576, filed on Jun. 27, 2019. The entirety of the above-mentioned patent application is hereby incorporated by reference herein and made a part of this specification.

BACKGROUND

Technical Field

The disclosure relates to an alternator and a rectifier, and more particularly to an alternator and a rectifier that can reduce power loss.

Description of Related Art

Figure 1:
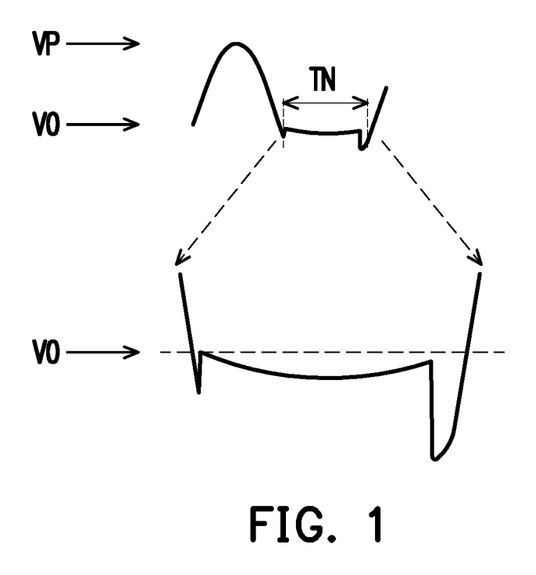
FIG. 1 shows a conventional waveform of a rectified voltage.

In an alternator, a rectifier device is often used to rectify the AC input voltage and generate a rectified voltage that can be considered a DC voltage. According to the conventional technology of this field, the rectification operation of the input voltage is often performed by controlling the opening and closing of a diode or a transistor. In an ideal state, in the negative half-cycle, the voltage value of the rectified voltage should be maintained at a reference voltage (for example, 0 volts). However, in actual cases, as shown in the conventional waveform diagram of the rectified voltage as shown in FIG. 1, the peak value is the rectified voltage of the voltage VP, and in its negative half-cycle TN, the voltage value of the rectified voltage is lower than its reference voltage V0. Moreover, in the case of a large rectified current, at the point in time when the negative half-cycle TN is about to end, the rectified voltage is locally out of control and a large negative pulse is generated. That is, in the negative half-cycle TN of the rectified voltage, power loss occurs, which reduces the operating efficiency of the system.

SUMMARY

The disclosure provides an alternator and a rectifier that can reduce power loss.

A rectifier according to an embodiment of the disclosure includes a rectifying transistor, a gate driving circuit and a voltage clamping circuit. The rectifying transistor includes a first terminal receiving an input voltage. A second terminal of the rectifying transistor generates a rectified voltage, and a control terminal of the rectifying transistor receives a gate voltage. The gate driving circuit is coupled to the rectifying transistor, and generates the gate voltage according to a voltage difference between the rectified voltage and the input voltage. The gate driving circuit makes the voltage difference substantially equal to a first reference voltage in a first time interval, and makes the voltage difference substantially equal to a second reference voltage in a second time interval after the first time interval. The voltage clamping circuit is coupled to the gate driving circuit and the rectifying transistor. The voltage clamping circuit provides a voltage clamping path by comparing the voltage difference with a third reference voltage and comparing the gate voltage with a fourth reference voltage in the second time interval to clamp the gate voltage to the first clamped voltage.

The alternator of the disclosure includes a rotor, a stator, and a plurality of rectifiers as described above. Each of the rectifiers receives a corresponding AC input voltage as the input voltage, and the rectifiers collectively generate the rectified voltage.

Based on the above, the rectifier of the disclosure maintains the voltage difference between two ends of the transistor to be equal to the first reference voltage in the first time interval of the negative half-cycle and equal to the second reference voltage in the second time interval. Moreover, the voltage clamping circuit of the rectifier can provide a voltage clamping path by comparing the voltage difference with a third reference voltage and comparing the gate voltage with a fourth reference voltage to clamp the gate voltage to the first clamped voltage. In this way, the power loss in the rectifier can be reduced, and the working efficiency is improved.

In order to make the aforementioned and other objectives and advantages of the disclosure comprehensible, embodiments accompanied with figures are described in detail below.

DESCRIPTION OF THE EMBODIMENTS

Figure 2:
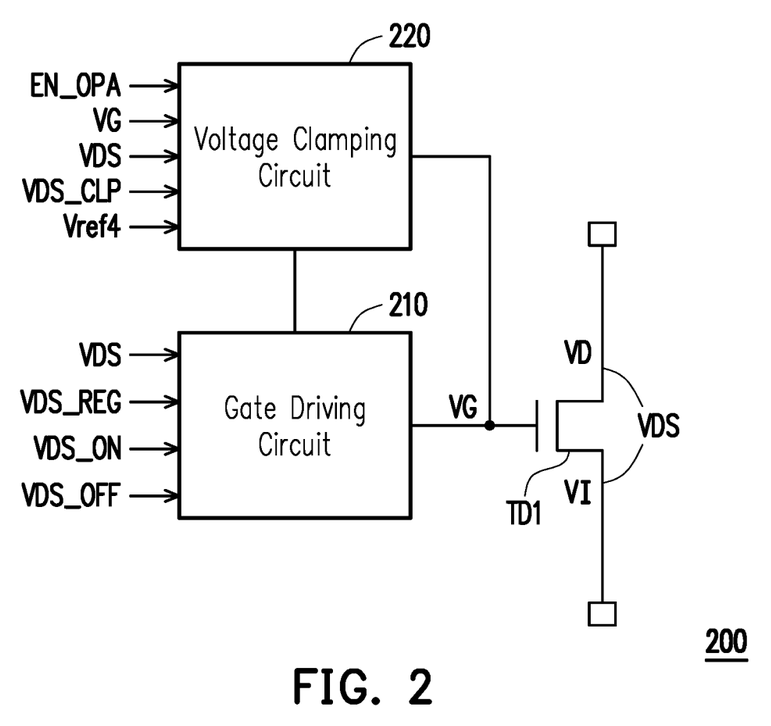
FIG. 2 shows a schematic diagram of a rectifier according to an embodiment of the disclosure.

Referring to FIG. 2, FIG. 2 shows a schematic diagram of a rectifier according to an embodiment of the disclosure. The rectifier 200 includes a transistor TD1, a gate driving circuit 210 and a voltage clamping circuit 220. The transistor TD1 has a first terminal receiving an input voltage VI. A second terminal of the transistor TD1 generates a rectified voltage VD, and a control terminal of the transistor TD1 receives a gate voltage VG. In the present embodiment, through the gate voltage VG, the operation of the transistor TD1 is equivalent to a diode, the first terminal of the transistor TD1 may be equivalent to an anode of the diode, and the second terminal of the transistor TD1 may be equivalent to a cathode of the diode.

The gate driving circuit 210 is coupled to the transistor TD1 and configured to provide the gate voltage VG. The gate driving circuit 210 receives the voltage difference VDS between the rectified voltage VD and the input voltage VI, and generates the gate voltage VG according to the voltage difference VDS. Regarding the details of generation of the gate voltage VG, the gate driving circuit 210 detects a change in the voltage difference VDS. The gate driving circuit 210 detects an initial time point at which the voltage difference VDS is less than the first predetermined threshold voltage VDS_ON, and provides the gate voltage VG in a first time interval after the initial time point to turn on the transistor TD1. Moreover, under the condition that the transistor TD1 is turned on according to the gate voltage VG, the voltage difference VDS may be equal to the first reference voltage.

Next, the gate driving circuit 210 adjusts the equivalent resistance value provided by the transistor TD1 by adjusting the gate voltage VG in a second time interval after the first time interval, so that the voltage difference VDS may be equal to the second reference voltage VDS_REG. In addition, the first reference voltage may be greater than, less than or equal to the second reference voltage VDS_REG.

The voltage clamping circuit 220 is coupled to the gate driving circuit 210 and the rectifying transistor TD1. The voltage clamping circuit 220 serves to provide a voltage clamping path. The voltage clamping circuit 220 may be used to clamp the gate voltage VG of the rectifying transistor TD1 to a predetermined voltage. The implementation details of the voltage clamping circuit 220 will be described later. The implementation details of the gate driving circuit 210 will be described below first.

Figure 3A:
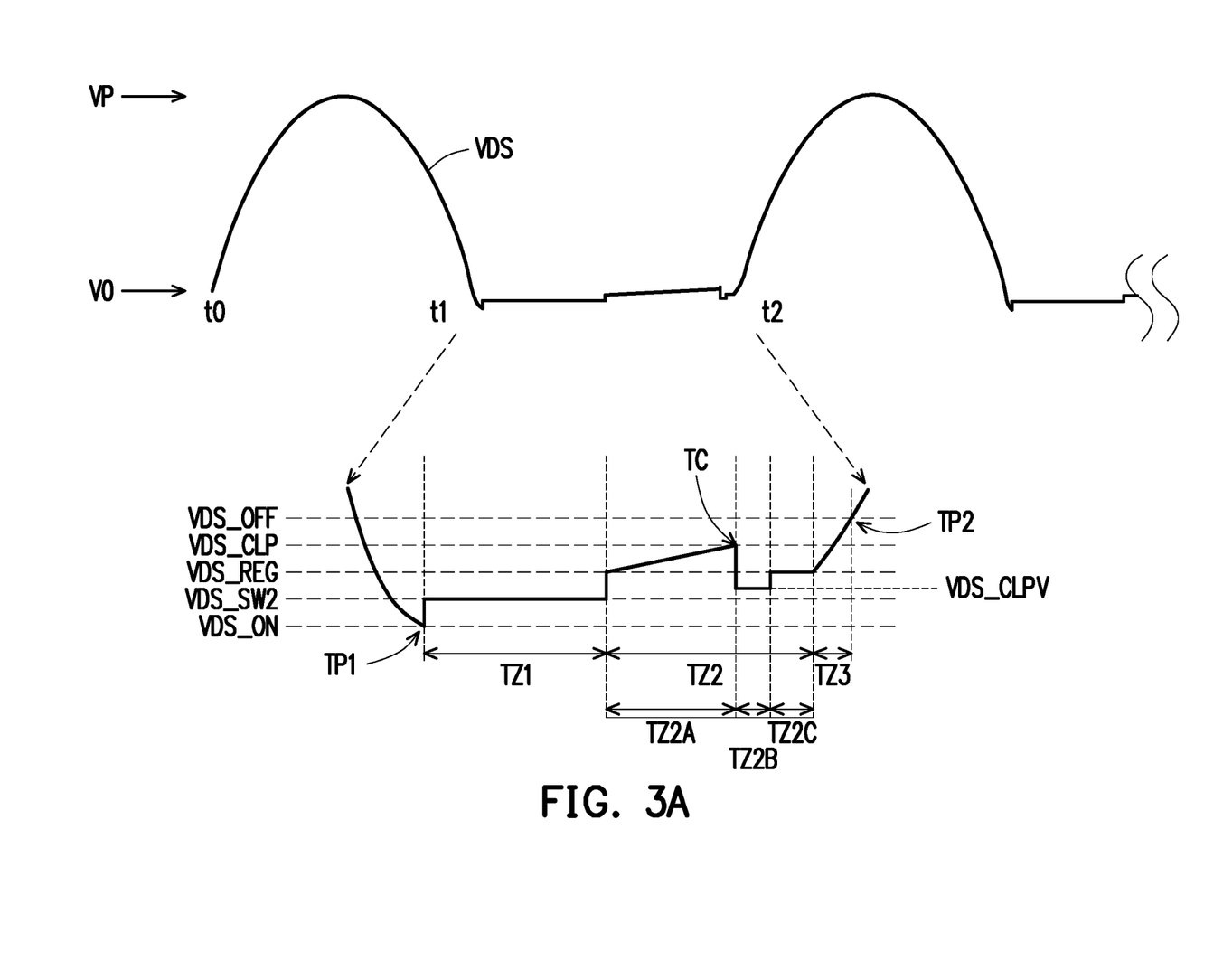
FIG. 3A shows a schematic waveform diagram of a voltage difference according to an embodiment of the disclosure.

Referring to FIG. 2 and FIG. 3A, FIG. 3A shows a schematic waveform diagram of a voltage difference according to an embodiment of the disclosure. The voltage difference VDS has a peak value of a voltage VP and has a reference voltage V0. The positive half-cycle of the voltage difference VDS is between the time points t0 and t1, and the negative half-cycle of the voltage difference VDS is between the time points t1 and t2. After the time point t1, the gate driving circuit 210 detects whether the voltage difference VDS is lower than the first predetermined threshold voltage VDS_ON, and sets an initial time point TP1 when the voltage difference VDS is lower than the first predetermined threshold voltage VDS_ON.

In the first time interval TZ1 after the initial time point TP1, the gate driving circuit 210 may turn on the transistor TD1 by providing the gate voltage VG, and maintain the voltage difference VDS to be substantially equal to the first reference voltage VDS_SW2. Here, the first reference voltage VDS_SW2 is the product of the on-resistance of the transistor and the current flowing through the transistor. In the first time interval TZ1, by taking the transistor TD1 as an N-type transistor as an example, the gate driving circuit 210 may provide a gate voltage VG which is a relatively high voltage to the control terminal of the transistor TD1 and fully turn on the transistor TD1. In this case, the first reference voltage VDS_SW2 described above may be equal to the product of the on-resistance of the transistor TD1 that is fully turned on or not fully turned on and the current flowing through the transistor TD1. If the transistor TD1 is in a fully on state, the on-resistance of the transistor TD1 is extremely small, so the voltage difference VDS can be maintained to be equal to the first reference voltage VDS_SW2 that is close to 0 volt.

Next, the gate driving circuit 210 may adjust the gate voltage VG in the second time interval TZ2 after the first time interval TZ1, so that the voltage difference VDS is substantially equal to the second reference voltage VDS_REG. In the second time interval, the gate driving circuit 210 may lower the voltage value of the gate voltage VG and increase the resistance of the transistor TD1 in the on state. At this time, the gate voltage VG provided by the gate driving circuit 210 may make the voltage difference VDS be the second reference voltage VDS_REG greater than the first reference voltage VDS_SW2. In an embodiment, the second reference voltage VDS_REG may be approximately equal to −70 millivolts (mV).

However, in actual operation, the product of the current value of the rectified current flowing through the transistor TD1 and the equivalent resistance value of the transistor TD1 becomes larger as the rectified current increases, so that the voltage difference VDS gradually becomes higher in the second time interval TZ2. The voltage clamping circuit 220 may clamp the voltage difference VDS to a predetermined voltage (i.e., the clamped voltage VDS_CLPV) when the voltage difference VDS reaches the third reference voltage VDS_CLP (less than the second predetermined threshold voltage VDS_OFF). In this way, the situation that in the second time interval TZ2, when the gate driving circuit 210 detects that the voltage difference VDS is greater than the second predetermined threshold voltage VDS_OFF, the transistor TD1 is turned off by adjusting the gate voltage VG, causing a current to flow through the body diode of the transistor TD1 and resulting in unnecessary power loss, can be prevented.

In the present embodiment, the time interval TZ2 may be divided into consecutive time intervals TZ2A, TZ2B and TZ2C. In the time interval TZ2A, the gate voltage VG is controlled by the gate driving circuit 210, and the voltage difference VDS gradually rises with the rectified current. In the time interval TZ2B, the gate voltage VG is controlled by the voltage clamping circuit 220, and the voltage clamping circuit 220 provides a clamping path to clamp the voltage difference VDS to the clamped voltage VDS_CLPV. In the time interval TZ2C, the voltage clamping circuit 220 cuts off the clamping path, and the gate voltage VG is again controlled by the gate driving circuit 210.

In the third time interval TZ3 after the second time interval TZ2, the voltage difference VDS starts to rise as the current flowing through the transistor TD1 decreases and the gate voltage VG is adjusted. Moreover, the gate driving circuit 210 may detect whether the voltage difference VDS is greater than the second predetermined threshold voltage VDS_OFF, and set a second time point TP2 when the voltage difference VDS is greater than the second predetermined threshold voltage VDS_OFF. The gate driving circuit 210 adjusts the gate voltage VG after the second time point TP2 so that the transistor TD1 is turned off.

On the other hand, the gate driving circuit 210 determines the initial time point by detecting whether the voltage difference VDS is less than the first predetermined threshold voltage VDS_ON. In the embodiment of the disclosure, the first predetermined threshold voltage VDS_ON may be less than the first reference voltage VDS_SW2 and the second reference voltage VDS_REG. When the voltage difference VDS drops below the first predetermined threshold voltage VDS_ON, the gate driving circuit 210 may determine the initial time point and initiate an adjustment mechanism of the gate voltage VG. In an embodiment, the first predetermined threshold voltage VDS_ON may be equal to −300 millivolts.

As can be seen from the above description, in the rectifier 200 of the embodiment of the disclosure, by adjusting the gate voltage VG by the gate driving circuit 210, it is possible to control a range of voltage values lower than 0 V in the voltage difference VDS, thereby effectively reducing unnecessary power loss. Moreover, the gate voltage VG is clamped by the voltage clamping circuit 220, and unnecessary power loss can be avoided as well.

In the present embodiment, the second predetermined threshold voltage VDS_OFF is greater than the first reference voltage VDS_SW2, the first reference voltage VDS_SW2 is less than the second reference voltage VDS_REG, and the second reference voltage VDS_REG is greater than the first predetermined threshold voltage VDS_ON.

Figure 3B:
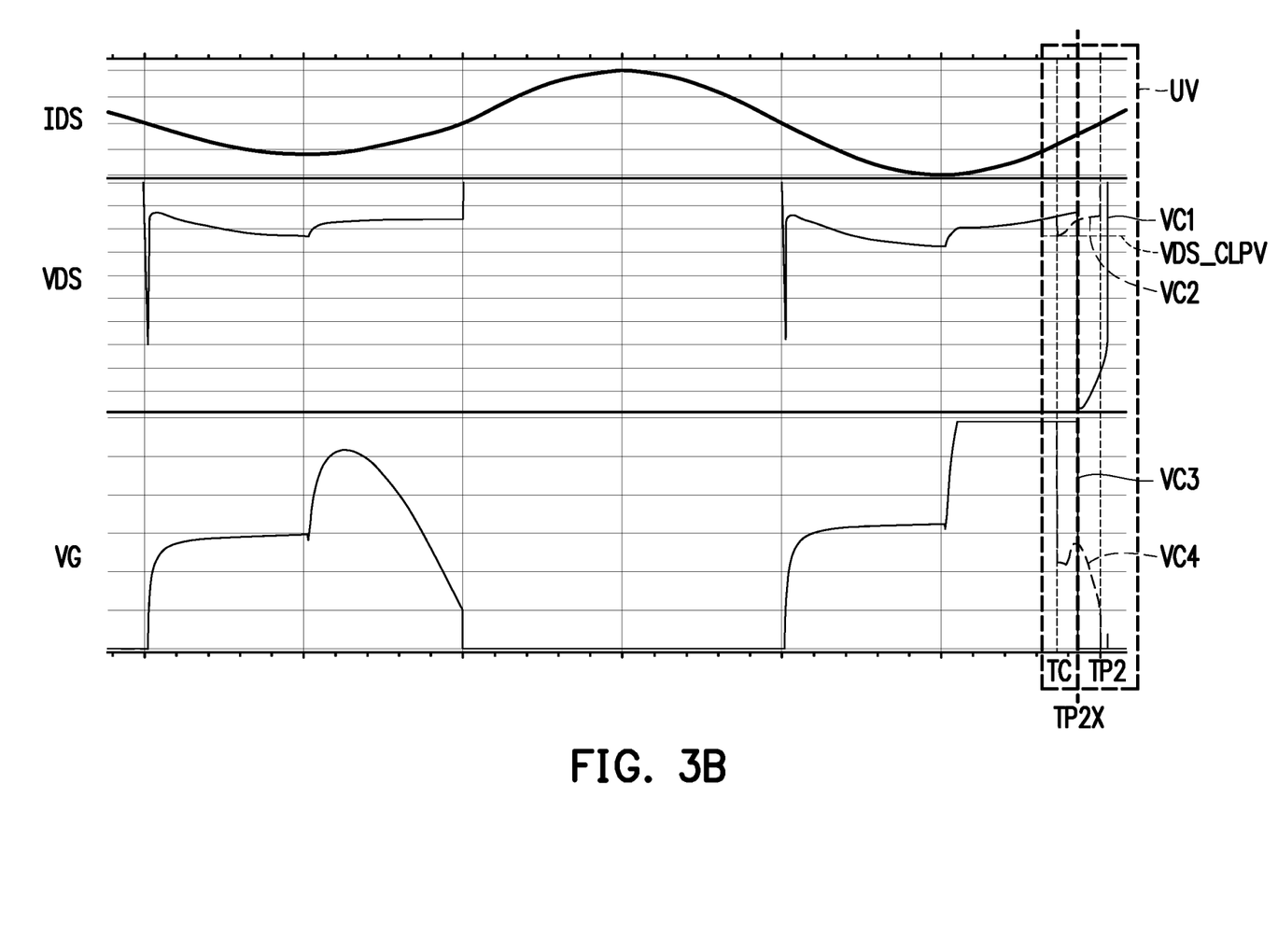
FIG. 3B shows a schematic waveform diagram of a transistor current, a voltage difference and a gate voltage according to an embodiment of the disclosure.
Figure 3C:
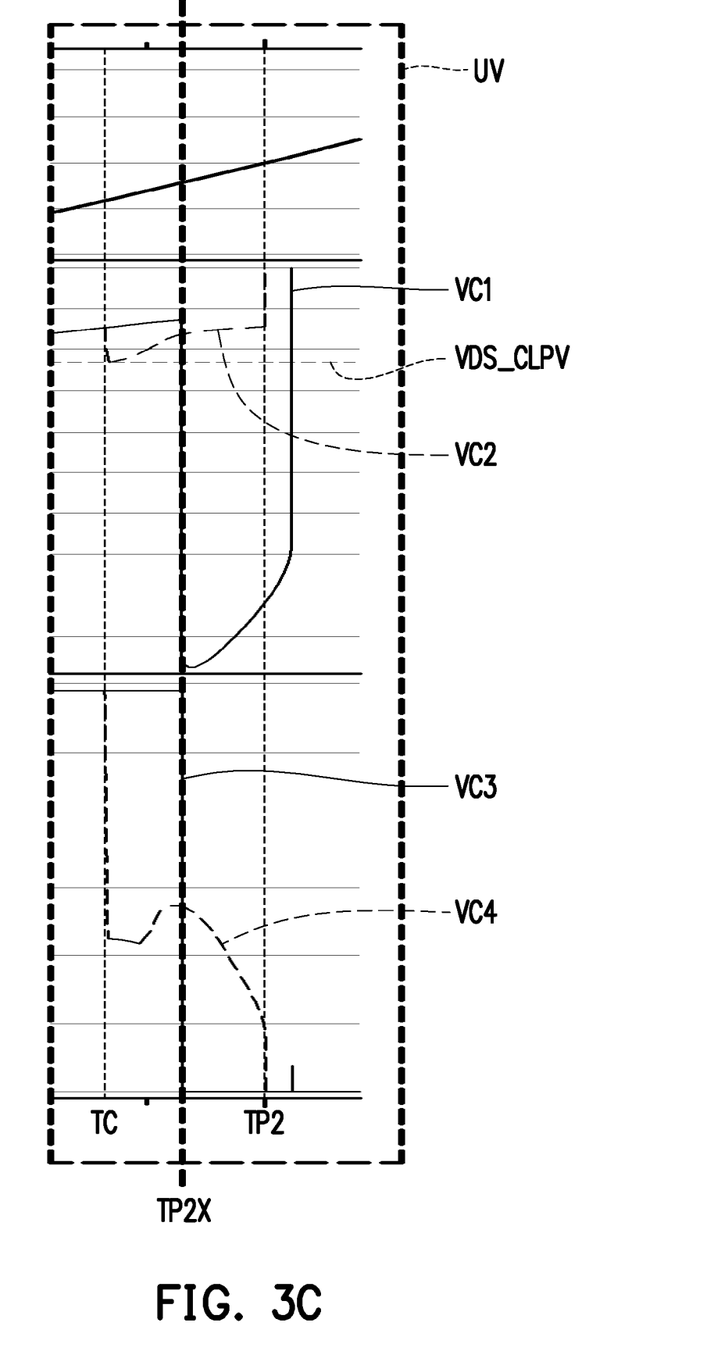
FIG. 3C is a schematic partial enlarged diagram of FIG. 3B.

Referring to FIG. 3B and FIG. 3C, FIG. 3B shows a schematic waveform diagram of a transistor current, a voltage difference and a gate voltage according to an embodiment of the disclosure, and FIG. 3C is a schematic partial enlarged diagram of FIG. 3B. Referring to the block UV in FIG. 3B and FIG. 3C, when the voltage clamping circuit 220 is not provided, the waveform curve of the voltage difference VDS is the curve VC1, and the waveform curve of the gate voltage VG is the curve VC3. When the voltage clamping circuit 220 is provided, the waveform curve of the voltage difference VDS is the curve VC2, and the waveform curve of the gate voltage VG is the curve VC4. As can be seen from the curve VC1, the voltage difference VDS has a negative pulse at a time point TP2X at which the negative half-cycle of the input voltage is about to end. In contrast, as can be seen from the curve VC2, at the time point TC before the time point TP2X, the voltage difference VDS is clamped at the clamped voltage VDS_CLPV and maintained for a predetermined time interval. After that, the voltage difference VDS gradually rises and rises sharply after the time point TP2. Therefore, the clamped voltage difference VDS can avoid power loss. In addition, as can be seen from the curve VC3, the gate voltage VG drops to a low logic potential at the time point TP2X, so that the transistor TD1 is turned off. As can be seen from the curve VC4, the gate voltage VG drops to a predetermined voltage before the time point TP2X and is maintained for a predetermined time interval. After that, the gate voltage VG gradually decreases and drops to the low logic potential at the time point TP2 so that the transistor TD1 is turned off.

Figure 4A:
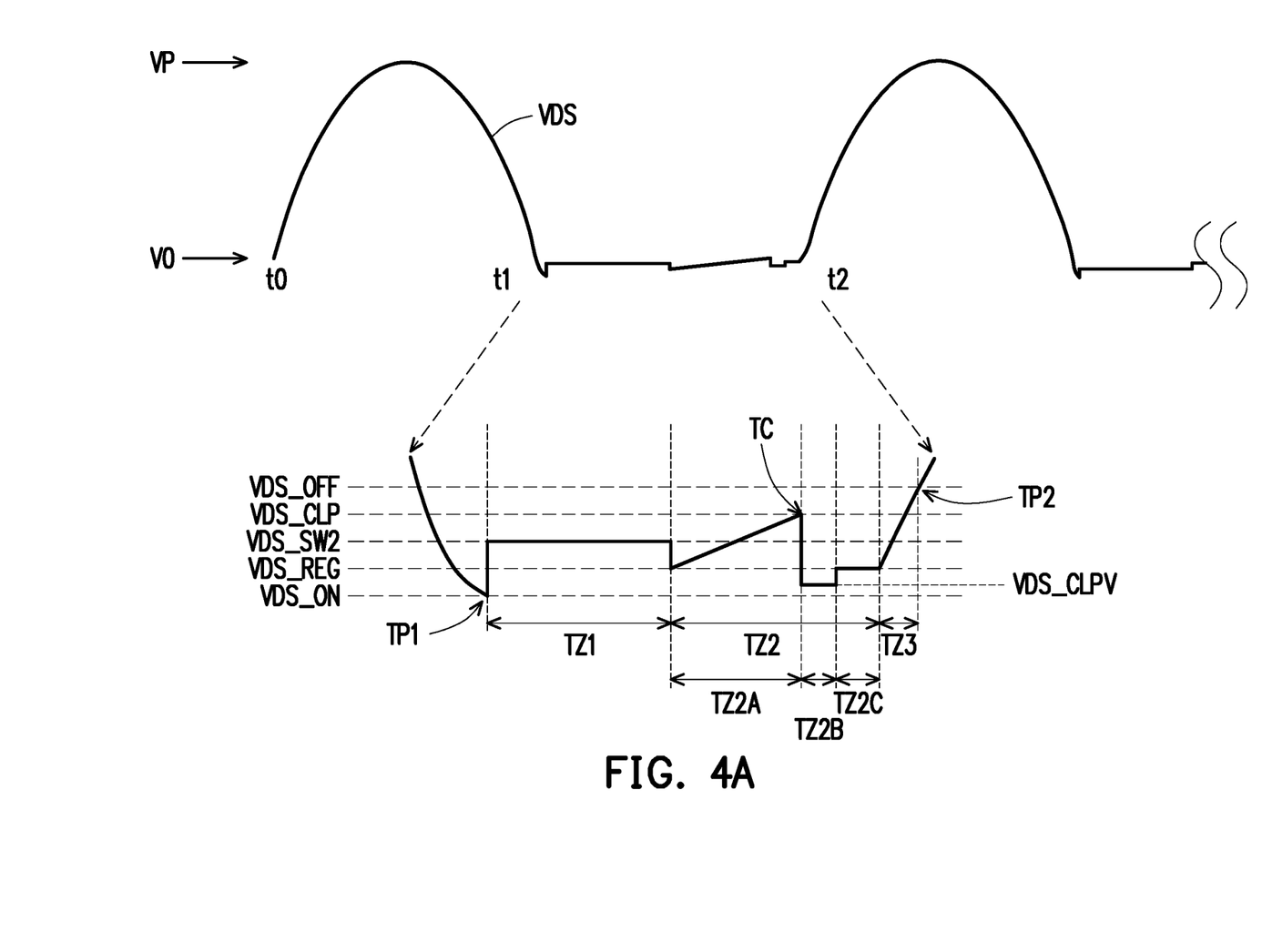
FIG. 4A shows a schematic waveform diagram of a voltage difference according to another embodiment of the disclosure.

Referring to FIG. 4A, FIG. 4A shows a schematic waveform diagram of a voltage difference according to another embodiment of the disclosure. The difference between the embodiments of FIG. 4A and FIG. 3A only lies in that the first reference voltage VDS_SW2 is greater than the second reference voltage VDS_REG. Same as the embodiment of FIG. 3A, the voltage clamping circuit 220 may clamp the voltage difference VDS to the clamped voltage VDS_CLPV for a predetermined time interval when the voltage difference VDS reaches the third reference voltage VDS_CLP.

Figure 4B:
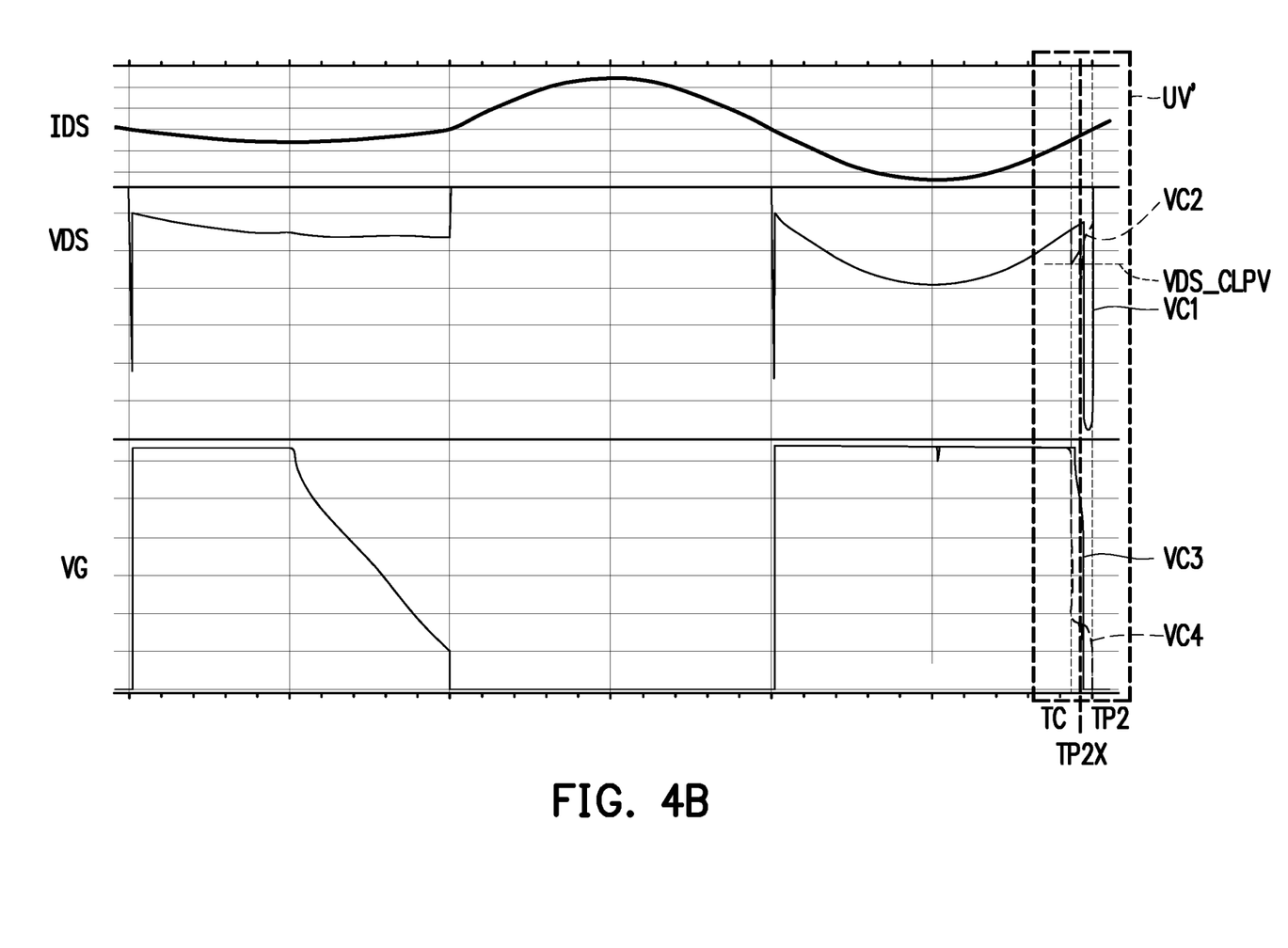
FIG. 4B shows a schematic waveform diagram of a voltage difference according to another embodiment of the disclosure.
Figure 4C:
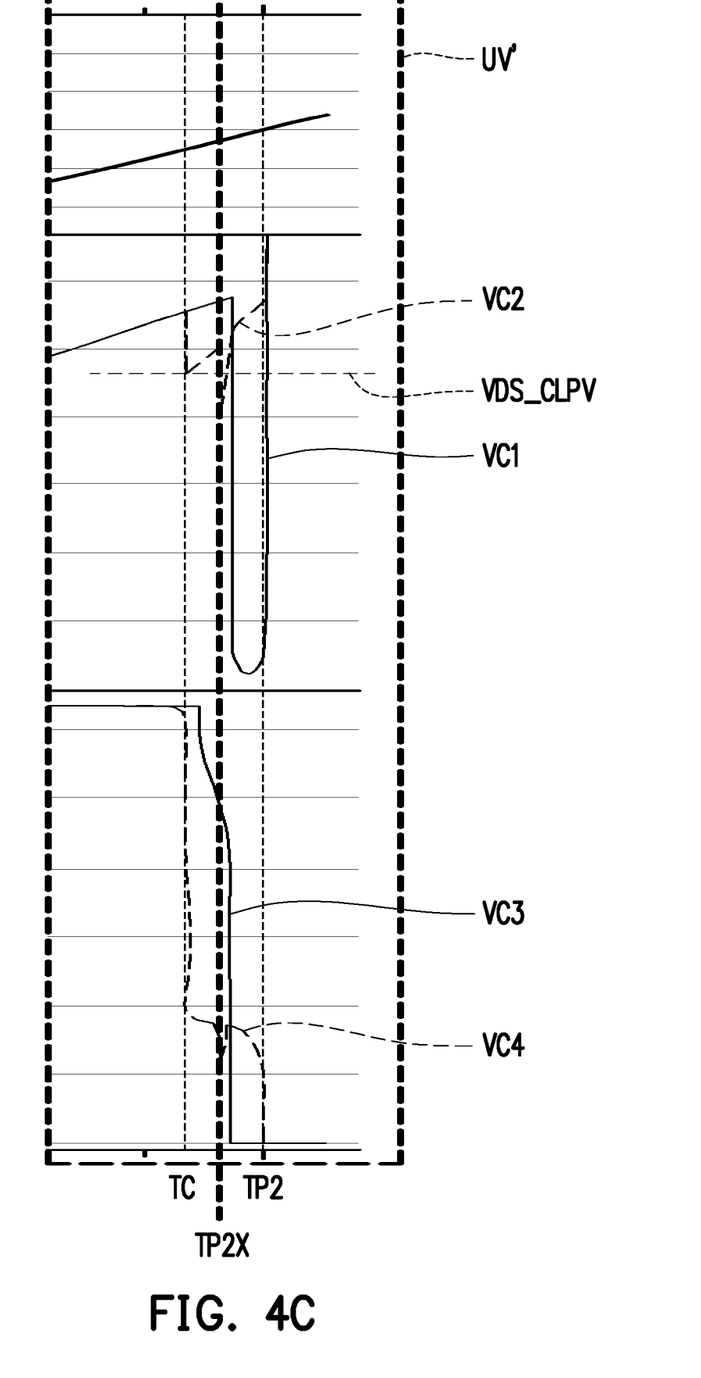
FIG. 4C is a schematic partial enlarged diagram of FIG. 4B.

Referring to FIG. 4B and FIG. 4C, FIG. 4B shows a schematic waveform diagram of a voltage difference according to another embodiment of the disclosure, and FIG. 4C is a schematic partial enlarged diagram of FIG. 4B. The difference between the embodiments of FIG. 4B and FIG. 3B only lies in that the first reference voltage VDS_SW2 is greater than the second reference voltage VDS_REG. Referring to the block UV' in FIG. 4B and FIG. 4C, when the voltage clamping circuit 220 is not provided, the waveform curve of the voltage difference VDS is the curve VC1, and the waveform curve of the gate voltage VG is the curve VC3. When the voltage clamping circuit 220 is provided, the waveform curve of the voltage difference VDS is the curve VC2, and the waveform curve of the gate voltage VG is the curve VC4. The same as the embodiment of FIG. 3B, the curve VC1 shows that the voltage difference VDS at the time point TP2X at which the negative half-cycle of the input voltage is about to end has a negative pulse. In contrast, the curve VC2 shows that at the time point TC before the time point TP2X, the voltage difference VDS is clamped to the clamped voltage VDS_CLPV and maintained for a predetermined time interval, thus avoiding power loss. In addition, in FIG. 4B, the curve VC3 shows that the gate voltage VG drops to a low logic potential at the time point TP2X so that the transistor TD1 is turned off. In contrast, the curve VC4 shows that the gate voltage VG drops to a predetermined voltage before the time point TP2X and is maintained for a predetermined time interval. After that, the gate voltage VG gradually decreases and drops to the low logic potential at the time point TP2 so that the transistor TD1 is turned off.

Figure 5:
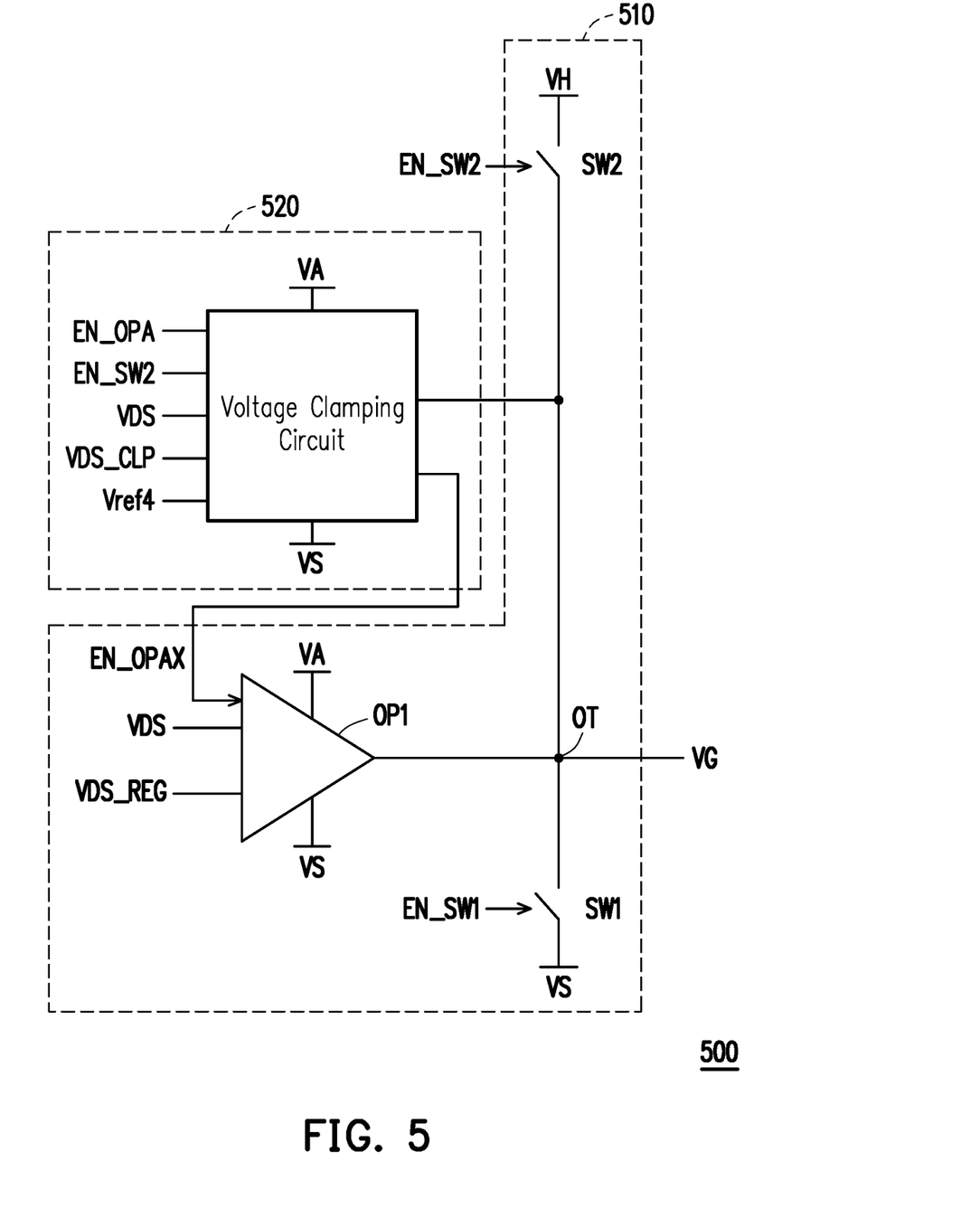
FIG. 5 shows a schematic partial diagram of a rectifier according to an embodiment of the disclosure.

Referring to FIG. 5, FIG. 5 shows a partial circuit schematic diagram of a rectifier according to an embodiment of the disclosure. The rectifier 500 includes a gate driving circuit 510 and a voltage clamping circuit 520. The gate driving circuit 510 includes an operational amplifier OP1, a switch SW1 and a switch SW2. The operational amplifier OP1 receives the voltage difference VDS and the adjustment voltage as the second reference voltage VDS_REG, and generates the gate voltage VG at the output terminal OT according to a control signal EN_OPAX. Besides, the operational amplifier OP1 receives a power source VA as an operational power source and receives the reference grounding voltage VS as a reference grounding voltage (hereinafter referred to as a reference grounding voltage VS). The switch SW2 is connected in series between the voltage VH and the output terminal OT. The switch SW2 is turned on or off according to a control signal EN_SW2. The switch SW1 is connected in series between the reference grounding voltage VS and the output terminal OT. The switch SW1 is turned on or off according to a control signal EN_SW1.

In terms of the operation details, the gate driving circuit 510 disables the operational amplifier OP1 through the control signal EN_OPAX after the initial time point (in the first time interval) at which the voltage difference VDS is less than the first predetermined threshold voltage, and turns on the switch SW2 through the control signal EN_SW2 to pull up the gate voltage VG to the voltage VH. At the same time, the switch SW1 is turned off according to the control signal EN_SW1. Next, in the second time interval after the first time interval, the gate driving circuit 510 makes the switches SW2 and SW1 to be turned off respectively through the control signals EN_SW2 and EN_SW1, and makes the operational amplifier OP1 be activated through the control signal EN_OPAX. In the second time interval, the operational amplifier OP1 provides the gate voltage VG at the output terminal OT by controlling the voltage difference VDS to be equal to the second reference voltage VDS_REG. Next, in the third time interval, the gate driving circuit 510 makes the switch SW2 be turned off respectively through the control signals EN_SW2 and EN_OPAX, and disables the operational amplifier OP1. Further, in the third time interval, the gate driving circuit 510 makes the switch SW1 be turned on through the control signal EN_SW1. Through the turned-on switch SW1, the gate voltage VG is pulled down to be equal to the reference grounding voltage VS, and the transistor TD1 is turned off.

With continued reference to FIG. 5, the voltage clamping circuit 520 receives a control signal EN_OPA, the control signal EN_SW2, the third reference voltage VDS_CLP and the fourth reference voltage Vref4. The voltage clamping circuit 520 is coupled to the gate driving circuit 510 and the control terminal of the transistor TD1. The voltage clamping circuit 520 is configured to disable the operational amplifier OP1 of the gate driving circuit 510 by generating a low logic potential control signal EN_OPAX when the switch SW2 is controlled to be turned off by the control signal EN_SW2 (for example, the control signal EN_SW2 has a low logic potential), the voltage difference VDS is greater than the third reference voltage VDS_CLP and the gate voltage VG is greater than the fourth reference voltage Vref4. In another aspect, the voltage clamping circuit 520 provides a voltage clamping path to clamp the voltage difference VDS so that the voltage difference VDS is equal to the clamped voltage VDS_CLPV. The voltage clamping circuit 520 cuts off the voltage clamping path after the clamped voltage difference VDS is maintained for a predetermined time interval, and then generates a high logic potential control signal EN_OPAX to enable the operational amplifier OP1. The operational amplifier OP1 performs a control operation of the gate voltage VG. In the present embodiment, the fourth reference voltage Vref4 may be equal to the operation power source VHH subtracted by the third reference voltage VDS_CLP.

Figure 6:
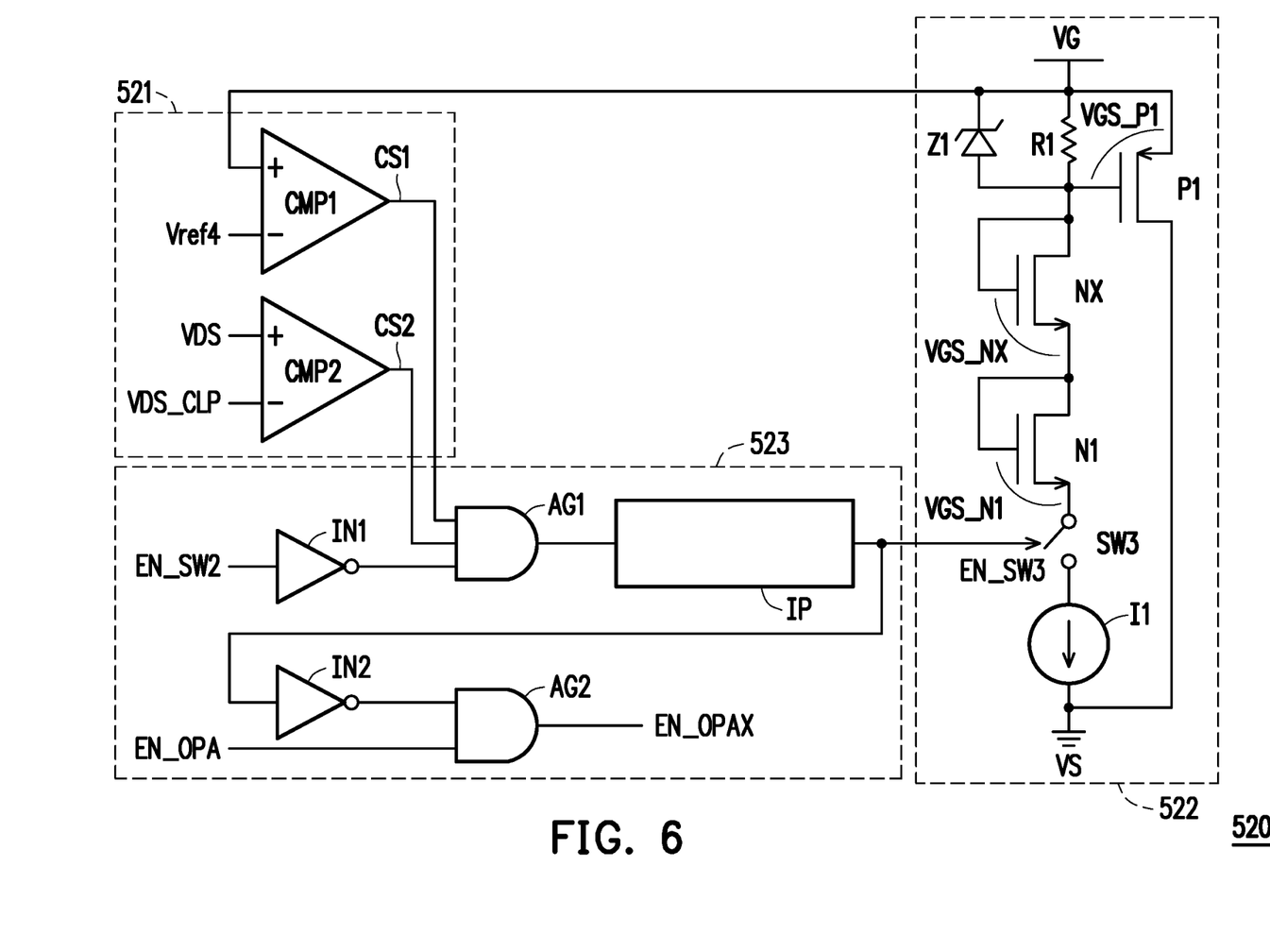
FIG. 6 shows a schematic diagram of a voltage clamping circuit according to an embodiment of the disclosure.

Referring to FIG. 6, FIG. 6 shows a schematic diagram of a voltage clamping circuit according to an embodiment of the disclosure. Referring to FIG. 6, the voltage clamping circuit 520 includes a comparison circuit 521, a clamping circuit 522 and a logic circuit 523. The comparison circuit 521 includes a comparator CMP1 and a comparator CMP2. The comparator CMP1 compares the gate voltage VG with the fourth reference voltage Vref4 to generate a comparison result CS1. The comparator CMP2 compares the voltage difference VDS with the third reference voltage VDS_CLP to generate a comparison result CS2. More specifically, the comparator CMP1 outputs a high logic potential comparison result CS1 when the gate voltage VG is greater than the fourth reference voltage, and the comparator CMP2 outputs a high logic potential comparison result CS2 when the voltage difference VDS is greater than the third reference voltage.

The clamping circuit 522 is coupled between the gate voltage VG and the reference grounding voltage VS. The clamping circuit 522 includes a third switch SW3, and the third switch SW3 is turned on or off according to a control signal EN_SW3. The clamping circuit 522 provides a voltage clamping path when the third switch SW3 is turned on, and cuts off the voltage clamping path when the third switch SW3 is turned off. The logic circuit 523 is coupled to the comparison circuit 521 and the clamping circuit 522. The logic circuit 523 generates the control signal EN_SW3 according to the comparison result CS1, the comparison result CS2 and the control signal EN_SW2. Specifically, the logic circuit 523 turns on the switch SW3 according to the control signal EN_SW3 when the gate voltage VG is greater than the fourth reference voltage, the voltage difference VDS is greater than the third reference voltage and the second switch SW2 is turned off according to the control signal EN_SW3.

The clamping circuit 522 may include N diodes, a switch SW3 and a current source I1, where N may be a positive integer greater than or equal to 1. In the present embodiment, the N diodes include diodes N1 and NX in the form of transistors, which are coupled in series with each other between the gate voltage VG and the first terminal of the switch SW3. The switch SW3 is coupled between the diode N1 and the current source I1 and is controlled by the control signal EN_SW3. The current source I1 is coupled between the second terminal of the switch SW3 and the reference grounding voltage VS to draw the current from the second terminal of the switch SW3.

In addition, the clamping circuit 522 may further include a transistor P1, a resistor R1 and a voltage limiting protection member Z1. The first terminal of the transistor P1 is coupled to the gate voltage VG, and the second terminal of the transistor P1 is coupled to the reference grounding voltage VS. In the present embodiment, the transistor P1 is a P-type transistor. A first terminal of the resistor R1 is coupled to the gate voltage VG, and a second terminal of the resistor R1 is coupled to the first terminal of the diode NX and the control terminal of the transistor P1. A first terminal of the voltage limiting protection member Z1 is coupled to the first terminal of the transistor P1, and a second terminal of the voltage limiting protection member Z1 is coupled to the control terminal of the transistor P1.

When the switch SW3 is turned on, the clamping circuit 522 provides a clamping path composed of the current source I1, the diode N1, the diode NX and the transistor P1. At this time, the gate voltage VG is equal to the sum of the voltage VGS_P1, the voltage VGS_NX and the voltage VGS_N1.

When the switch SW3 is turned off, the clamping path is cut off. The resistor R1 may pull the potential of the control terminal of the transistor P1 high to ensure that the transistor P1 is turned off. The voltage limiting protection member Z1 is coupled between the source terminal and the gate terminal of the transistor P1 to perform a voltage limiting protection function. The voltage limiting protection member Z1 may be a Zener diode or other type of voltage limiting protection member, which is not limited by the disclosure.

In the present embodiment, the logic circuit 523 may perform an AND operation on the comparison result CS1, the comparison result CS2 and the inverted control signal EN_SW2, and generate a control signal EN_SW3 according to the result of the AND operation to turn on or off the switch SW3. Further, the logic circuit 523 performs an AND operation on the control signal EN_OPA and the inverted control signal EN_SW3, and the operational amplifier OP1 enables or disables the result controlled by the AND operation.

Specifically, the logic circuit 523 may include an AND gate AG1, an AND gate AG2, an inverter IN1, an inverter IN2 and a pulse wave generator IP. The inverter IN1 receives the control signal EN_SW2 and outputs the inverted control signal EN_SW2. The AND gate AG1 receives the comparison result CS1, the comparison result CS2 and the inverted control signal EN_SW2. The output of the AND gate AG1 is low when any one of the comparison result CS1, the comparison result CS2 and the inverted control signal EN_SW2 is a low logic potential. When the comparison result CS1, the comparison result CS2 and the inverted control signal EN_SW2 are all high logic potentials, the logic potential of the output voltage of the AND gate AG1 is turned from low to high. The pulse wave generator IP may be a one-shot circuit. When the logic potential of the output voltage of the AND gate AG1 is turned from low to high, the one-shot circuit is triggered to make the one-shot circuit output a high logic potential pulse wave. The width of the pulse wave is preset, and the width of the pulse wave is small compared to the length of the pulse wave period. The setting of the pulse wave width may depend on the response speed of the voltage clamping circuit 522 and the time required for the operational amplifier (not shown) of the gate driving circuit to perform the disable operation. The one-shot circuit is triggered to generate a pulse wave (i.e., control signal EN_SW3) to turn on the switch SW3 of the voltage clamping circuit 522 in a set time interval so that the gate voltage VG is clamped. Then the switch SW3 is turned off, the clamping path is cut off.

The inverter IN2 of the logic circuit 523 receives the control signal EN_SW3 and outputs the inverted control signal EN_SW3. That is, when the control signal EN_SW3 is at a high logic potential, the output of the inverter IN2 is at a low logic potential. The AND gate AG2 receives the inverted control signal EN_SW3 and the control signal EN_OPA. When the inverted control signal EN_SW3 is at a low logic potential and the control signal EN_OPA is at a high logic potential, the control signal EN_OPAX output from the AND gate AG2 is at a low logic potential, so that the operational amplifier OP1 of the gate driving circuit is disabled. When the output voltage of the one-shot circuit IP returns to the steady state (i.e., the control signal EN_SW3 returns to the low logic potential), the switch SW3 is turned off and the clamping path is cut off, so that the output EN_OPAX of the AND gate AG2 is at a high logic potential. At this time, the operational amplifier OP1 of the gate driving circuit is enabled again.

It should be noted that, when the gate voltage VG is not greater than the fourth reference voltage Vref4 and the voltage difference VDS is not greater than the third reference voltage VDS_CLP, if the control signal EN_SW2 is at a high logic potential, the control signal EN_SW3 is maintained at a low logic potential, so that an input of the corresponding AND gate AG2 is maintained at a high logic potential. Therefore, in this case, the disabling and enabling of the operational amplifier OP1 of the gate driving circuit 510 are completely dependent on the control signal EN_OPA. Conversely, when the gate voltage VG is greater than the fourth reference voltage Vref4 and the voltage difference VDS is greater than the third reference voltage VDS_CLP, if the control signal EN_SW2 is at a low logic potential, the control signal EN_SW3 is switched to a high logic potential, so that an input of the corresponding AND gate AG2 is switched to a low logic potential. In this case, regardless of the control signal EN_OPA, the operational amplifier OP1 of the gate driving circuit 510 is disabled due to the low logic potential of the control signal EN_OPAX.

In summary, the voltage clamping circuit described above may disable the operational amplifier OP1 of the gate driving circuit 510 when the switch SW2 is turned off, the voltage difference VDS is greater than the third reference voltage VDS_CLP and the gate voltage VG is greater than the fourth reference voltage Vref4, and provide a voltage clamping path to clamp the gate voltage VG for a predetermined time interval. In this way, the voltage clamping circuit may prevent the voltage difference VDS from having a large negative pulse when the negative half-cycle is about to end, thereby avoiding power loss.

Figure 7:
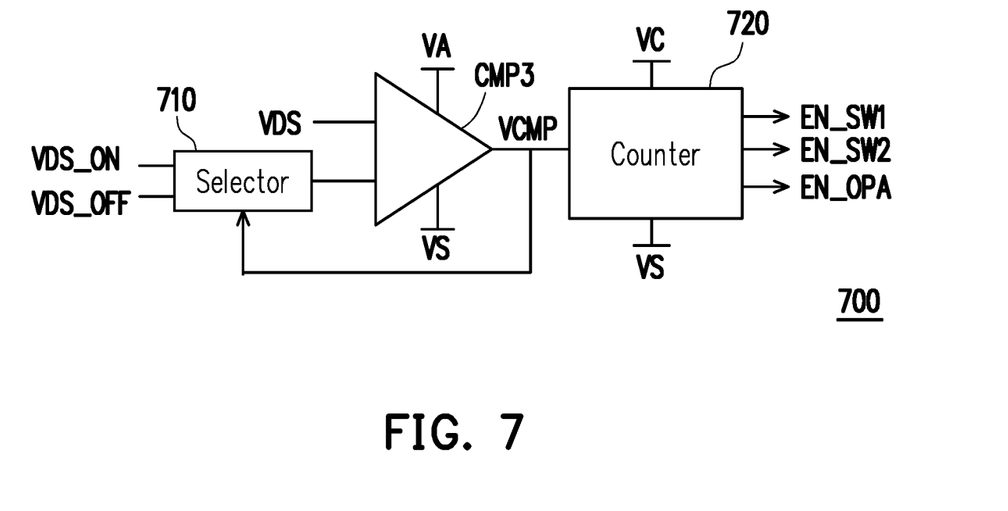
FIG. 7 shows a schematic diagram of a control signal generator according to an embodiment of the disclosure.

Regarding the above embodiment, the control signals EN_OPA, EN_SW1 and EN_SW2 may be generated by providing a control signal generator in the gate driving circuit. An example of the implementation of the control signal generator is shown in FIG. 7. FIG. 7 shows a schematic diagram of a control signal generator according to an embodiment of the disclosure. In FIG. 7, the control signal generator 700 includes a selector 710, a comparator CMP3 and a counter 720. The selector 710 receives the first predetermined threshold voltage VDS_ON and the second predetermined threshold voltage VDS_OFF, and is configured to select the first predetermined threshold voltage VDS_ON or the second predetermined threshold voltage VDS_OFF to be provided to the comparator CMP3. The comparator CMP3 is coupled to the selector 710 and compares the voltage difference VDS with one of the first predetermined threshold voltage VDS_ON and the second predetermined threshold voltage VDS_OFF to generate a comparison result VCMP. It should be noted that the comparison result VCMP may be fed back to the selector 710, so that the selector 710 may select one of the first predetermined threshold voltage VDS_ON and the second predetermined threshold voltage VDS_OFF according to the comparison result VCMP for output.

In detail, in the initial state, the selector 710 selects the first predetermined threshold voltage VDS_ON to be output to the comparator CMP3. The comparator CMP1 compares the voltage difference VDS with the first predetermined threshold voltage VDS_ON, and, when the voltage difference VDS is less than the first predetermined threshold voltage VDS_ON (initial time point), adjusts the comparison result VCMP so that the selector 710 selects the second predetermined threshold voltage VDS_OFF to be output to the comparator CMP3.

In accordance with the above embodiment, next, the comparator CMP3 compares the voltage difference VDS with the second predetermined threshold voltage VDS_OFF, and, when the voltage difference VDS is greater than the second predetermined threshold voltage VDS_OFF (second time point), adjusts the comparison result VCMP to change the selector 710 to reselect the first predetermined threshold voltage VDS_ON to be output to the comparator CMP3.

The counter 720 is coupled to the comparator CMP3, and the counter 720 receives the power source VC, and performs a counting operation according to the comparison result VCMP. The counting operation of the counter 720 starts at the initial time point TP1 and ends at the second time point TP2. The counting operation of the counter 720 may produce a gradually varying (increasing or decreasing) count value. By taking the increasing counting operation as an example, the counter 120 may set the gate driving circuit to operate in the first time interval TZ1 when the count value is less than a reference value, and set the gate drive circuit to operate in the second time interval TZ2 or the third time interval TZ3 when the count value is between the reference value REFV and the maximum counting value. Moreover, the counter 720 may generate corresponding control signals EN_OPA, EN_SW1 and EN_SW2 according to the gate driving circuit 510 operating in the first time interval TZ1, the second time interval TZ2 or the third time interval TZ3.

Figure 8:
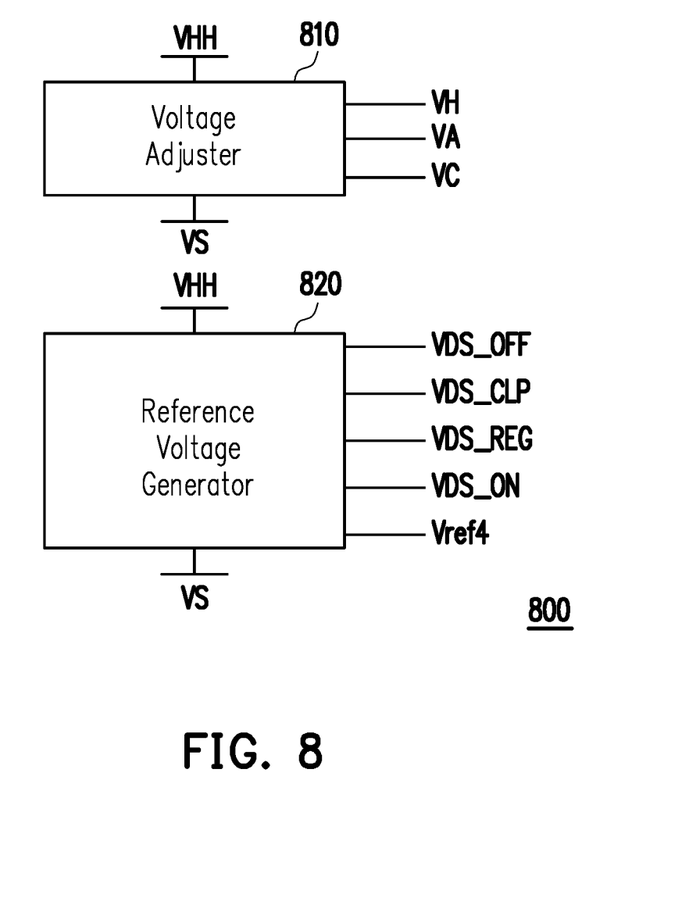
FIG. 8 shows a schematic diagram of a voltage generator according to an embodiment of the disclosure.

On the other hand, in the embodiment of FIG. 5 described above, the voltage VH, the second reference voltage VDS_REG, the third reference voltage VDS_CLP, the fourth reference voltage Vref4, the first predetermined threshold voltage VDS_ON, the second predetermined threshold voltage VDS_OFF, the power source VA and the power source VC may be generated by providing a voltage generator in the gate driving circuit. An example of the implementation of the voltage generator is shown in FIG. 8. FIG. 8 shows a schematic diagram of a voltage generator according to an embodiment of the disclosure. In FIG. 8, the voltage generator 800 includes a voltage adjuster 810 and a reference voltage generator 820. The voltage adjuster 810 receives the operation power source VHH and performs a voltage adjustment operation according to the operation power source VHH to generate the voltage VH, the power source VA and the power source VC. The reference voltage generator 820 receives the operation power source VHH and generates the second reference voltage VDS_REG, the third reference voltage VDS_CLP, the fourth reference voltage Vref4, the first predetermined threshold voltage VDS_ON and the second predetermined threshold voltage VDS_OFF.

The hardware architecture of the voltage adjuster 810 and the reference voltage generator 820 may be constructed by using any voltage generating circuit well known to those of ordinary skill in the art, and is not particularly limited.

Figure 9:
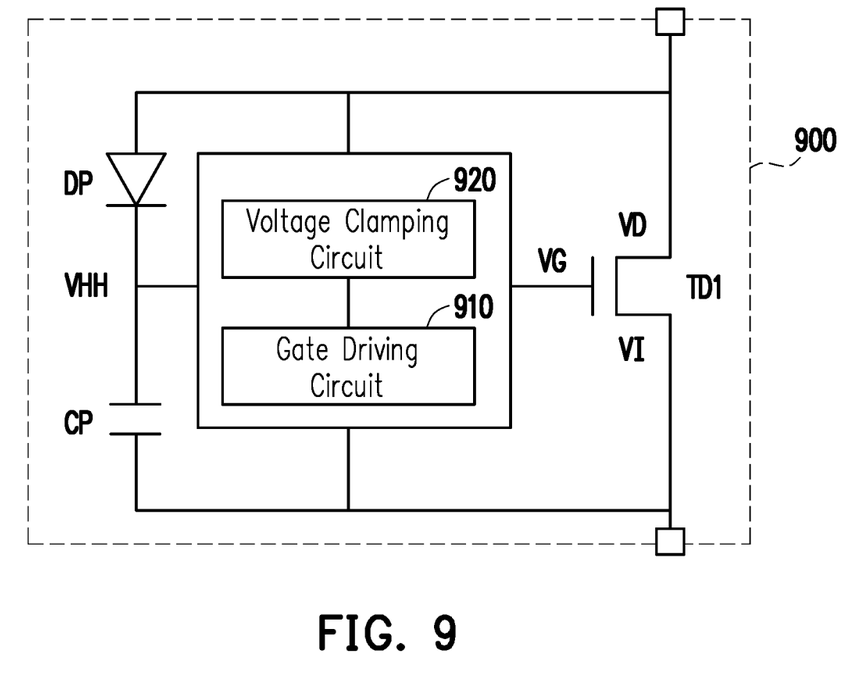
FIG. 9 shows a schematic diagram of a rectifier according to an embodiment of the disclosure.

Referring to FIG. 9, FIG. 9 shows a schematic diagram of a rectifier according to an embodiment of the disclosure. The rectifier 900 includes a transistor TD1, a gate driving circuit 910, a voltage clamping circuit 920, a diode DP and a capacitor CP. The gate driving circuit 910 and the voltage clamping circuit 920 may be implemented by applying the above-described gate driving circuit 510 and voltage clamping circuit 520. The anode of the diode DP is coupled to the second terminal of the transistor TD1, and the cathode of the diode DP is coupled to the terminal of the gate driving circuit 910 that receives the operation power source VHH. The capacitor CP is coupled between the cathode of the diode DP and the first terminal of the transistor TD1. During the period in which the transistor TD1 is not operating, the capacitor CP is charged to the operating power source VHH via the diode DP to supply the power source of the transistor TD1 during the operation.

Figure 10:
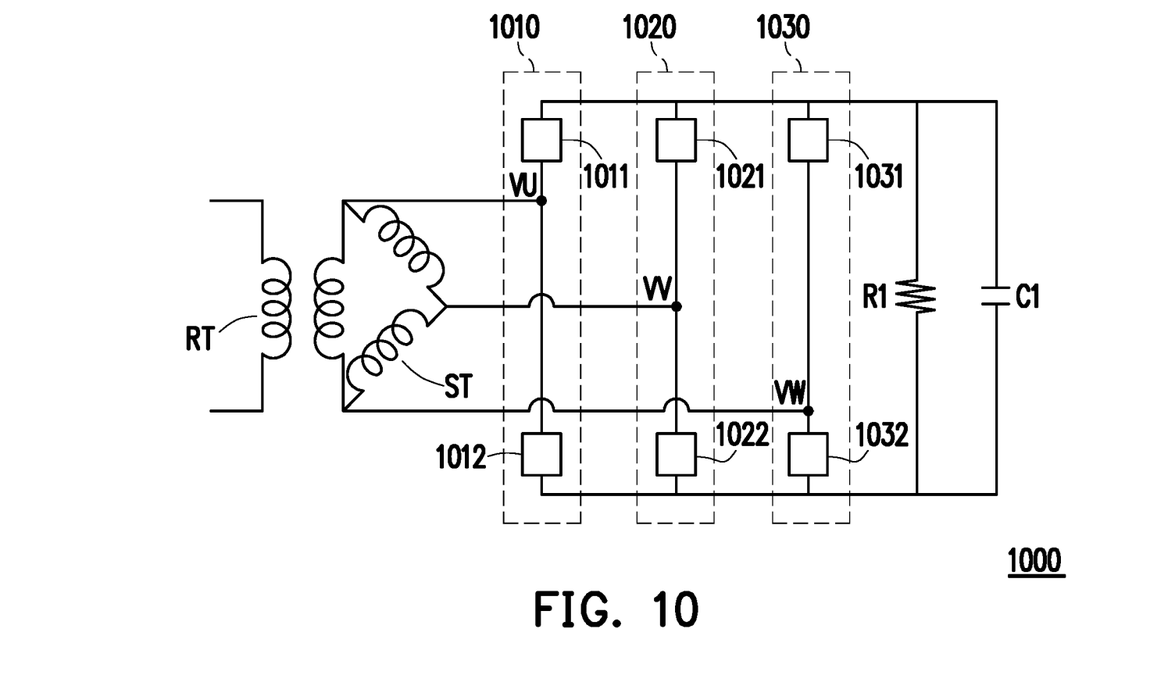
FIG. 10 shows a schematic diagram of an alternator according to an embodiment of the disclosure.

Referring to FIG. 10, FIG. 10 shows a schematic diagram of an alternator according to an embodiment of the disclosure. The alternator 1000 includes a rotor RT, a stator ST and a plurality of rectifiers 1011 to 1032. In the present embodiment, the stator ST generates a plurality of phase voltages VU, VV and VW. The phase voltages VU, VV and VW are respectively supplied to a plurality of rectifier circuits 1010, 1020 and 1030 of different phases. The rectifier circuit 1010 includes rectifiers 1011 and 1012 coupled in series. The rectifier circuit 1020 includes rectifiers 1021 and 1022 coupled in series. The rectifier circuit 1030 includes rectifiers 1031 and 1032 coupled in series. In the present embodiment, the alternator 1000 includes a resistor R1 (which is an equivalent load or an equivalent resistor of a rechargeable battery) and a capacitor C1 (which is an equivalent charging capacitor) that are coupled in parallel, and is configured to generate a rectified output voltage close to direct current.

Based on the above, in the disclosure, the gate voltage is generated by the gate driving circuit, and the voltage value of the voltage difference is controlled by the gate voltage in the negative half-cycle of the voltage difference between two ends of the transistor. Moreover, in the disclosure, the gate voltage may be further clamped by the voltage clamping circuit so that the gate voltage is continuously controlled during the negative half-cycle of the input voltage. In this way, the power loss that the rectifier may possibly generate can be reduced, and the working efficiency is improved.

Although the disclosure has been disclosed with the above embodiments, it is not intended to limit the disclosure. Any person of ordinary skill in the art can make some changes and modifications without departing from the spirit and scope of the disclosure. Therefore, the protection scope of the disclosure shall be defined by the appended claims.

What is claimed is:

1. A rectifier, comprising:
   a rectifying transistor, comprising a first terminal receiving an input voltage, wherein a second terminal of the rectifying transistor generates a rectified voltage, and a control terminal of the rectifying transistor receives a gate voltage;
   a gate driving circuit, coupled to the rectifying transistor, and generating the gate voltage according to a voltage difference between the rectified voltage and the input voltage, wherein the gate driving circuit makes the voltage difference substantially equal to a first reference voltage in a first time interval, and makes the voltage difference substantially equal to a second reference voltage in a second time interval after the first time interval; and
   a voltage clamping circuit, coupled to the gate driving circuit and the rectifying transistor, wherein the voltage clamping circuit provides a voltage clamping path by comparing the voltage difference with a third reference voltage and comparing the gate voltage with a fourth reference voltage in the second time interval to clamp the gate voltage to a first clamped voltage.

2. The rectifier according to claim 1, wherein the gate driving circuit is configured to:
   detect an initial time point at which the voltage difference is less than a first predetermined threshold voltage, and provide the gate voltage in the first time interval after the initial time point to turn on the rectifying transistor, such that the voltage difference is substantially equal to the first reference voltage;
   adjust the gate voltage in the second time interval such that the voltage difference is substantially equal to the second reference voltage; and
   detect a second time point at which the voltage difference rises from the second reference voltage to a second predetermined threshold voltage in a third time interval after the second time interval, and adjust the gate voltage after the second time point such that the transistor is turned off, wherein the first reference voltage is greater than, less than or equal to the second reference voltage.

3. The rectifier according to claim 2, wherein the gate driving circuit comprises:
   an operational amplifier, receiving the voltage difference and an adjustment voltage to generate the gate voltage at an output terminal according to a first control signal;
   a first switch, connected in series between a reference grounding voltage and the output terminal to be turned on or off according to a second control signal; and
   a second switch, connected in series between a first power source and the output terminal to be turned on or off according to a third control signal,
   wherein the adjustment voltage is equal to the second reference voltage.

4. The rectifier according to claim 3, wherein the voltage clamping circuit comprises:
   a comparison circuit, comprising a first comparator and a second comparator, wherein the first comparator is configured to compare the gate voltage with the fourth reference voltage to generate a first comparison result, and the second comparator is configured to compare the voltage difference with the third reference voltage to generate a second comparison result;
   a clamping circuit, coupled between the control terminal of the rectifying transistor and the reference grounding voltage, wherein the clamping circuit comprises a third switch, the third switch is turned on or off according to a fourth control signal, and the clamping circuit is configured to provide the voltage clamping path when the third switch is turned on; and
   a logic circuit, coupled to the comparison circuit and the clamping circuit, and generating the fourth control signal according to the first comparison result, the second comparison result and the third control signal, wherein the logic circuit is configured to turn on the third switch according to the fourth control signal when the gate voltage is greater than the fourth reference voltage, the voltage difference is greater than the third reference voltage and the second switch is turned off according to the third control signal.

5. The rectifier according to claim 4, wherein the clamping circuit further comprises:
   N diodes, coupled in series with each other between the control terminal of the rectifying transistor and a first terminal of the third switch, wherein N is a positive integer; and
   a current source, providing a current to a second terminal of the third switch.

6. The rectifier according to claim 5, wherein the clamping circuit further comprises:
   a first transistor, wherein a first terminal of the first transistor is coupled to the control terminal of the rectifying transistor, and a second terminal of the first transistor is coupled to the reference grounding voltage;
   a first resistor, wherein a first terminal of the first resistor is coupled to the control terminal of the rectifying transistor, and a second terminal of the first resistor is coupled to a first terminal of the N diodes and a control terminal of the first transistor; and
   a voltage limiting protection member, wherein a first terminal of the voltage limiting protection member is coupled to the first terminal of the first transistor, and a second terminal of the voltage limiting protection member is coupled to the control terminal of the first transistor.

7. The rectifier according to claim 4, wherein the logic circuit is further configured to:
   perform an AND operation on the first comparison result, the second comparison result and an inverted third control signal, and generate the fourth control signal according to a result of the AND operation to turn on or off the third switch, and
   perform the AND operation on the first control signal and an inverted fourth control signal to generate a disable signal to disable the operational amplifier.

8. The rectifier according to claim 7, wherein the logic circuit comprises:
   a first AND gate, performing the AND operation on the first comparison result, the second comparison result and the inverted third control signal;
   a pulse wave generator, configured to generate the fourth control signal according to the result of the AND operation; and
   a second AND gate, performing the AND operation on the first control signal and the inverted fourth control signal to generate the disable signal.

9. The rectifier according to claim 4, wherein the fourth control signal has a pulse wave, and the third switch is turned off after the pulse wave disappears, such that the clamping path is cut off and the operational amplifier is enabled.

10. The rectifier according to claim 3, wherein the gate driving circuit further comprises:
    a voltage generator, configured to generate the first power source, the adjustment voltage, the first predetermined threshold voltage, the second predetermined threshold voltage and the first clamped voltage according to an operation power source.

11. The rectifier according to claim 10, wherein the voltage generator comprises:
    a voltage adjuster, configured to generate a first power source and a second power source of the operational amplifier and the counter according to the operation power source; and
    a reference voltage generator, configured to generate the first predetermined threshold voltage, the second predetermined threshold voltage, the adjustment voltage and the first clamped voltage according to the operation power source,
    wherein the fourth reference voltage is a voltage difference between the operation power source and the first clamped voltage, and the fourth adjustment voltage is equal to the first clamped voltage.

12. An alternator, comprising:
    a rotor;
    a stator, coupled to the rotor, and generating a plurality of AC input voltages; and
    a plurality of rectifiers according to claim 1, wherein each of the rectifiers receives a corresponding AC input voltage as the input voltage, and the rectifiers collectively generate the rectified voltage.

* * * * *